April 10, 1951  J. H. COOMBES  2,548,839
CUSHIONED RAILWAY WHEEL
Filed Aug. 22, 1947  2 Sheets-Sheet 1
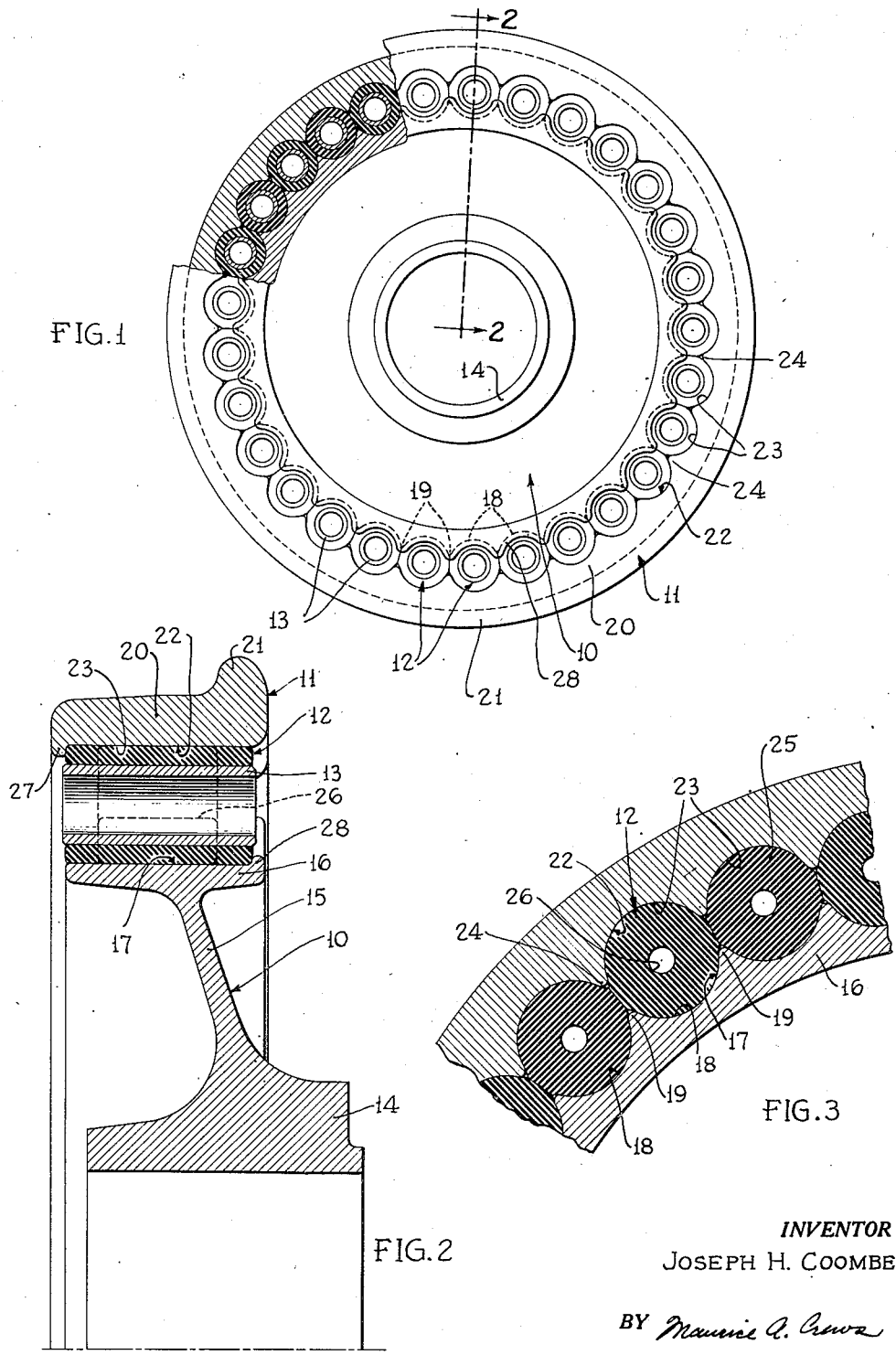
INVENTOR
JOSEPH H. COOMBES
BY Maurice A. Crews
ATTORNEY April 10, 1951    J. H. COOMBES    2,548,839
CUSHIONED RAILWAY WHEEL
Filed Aug. 22, 1947    2 Sheets-Sheet 2
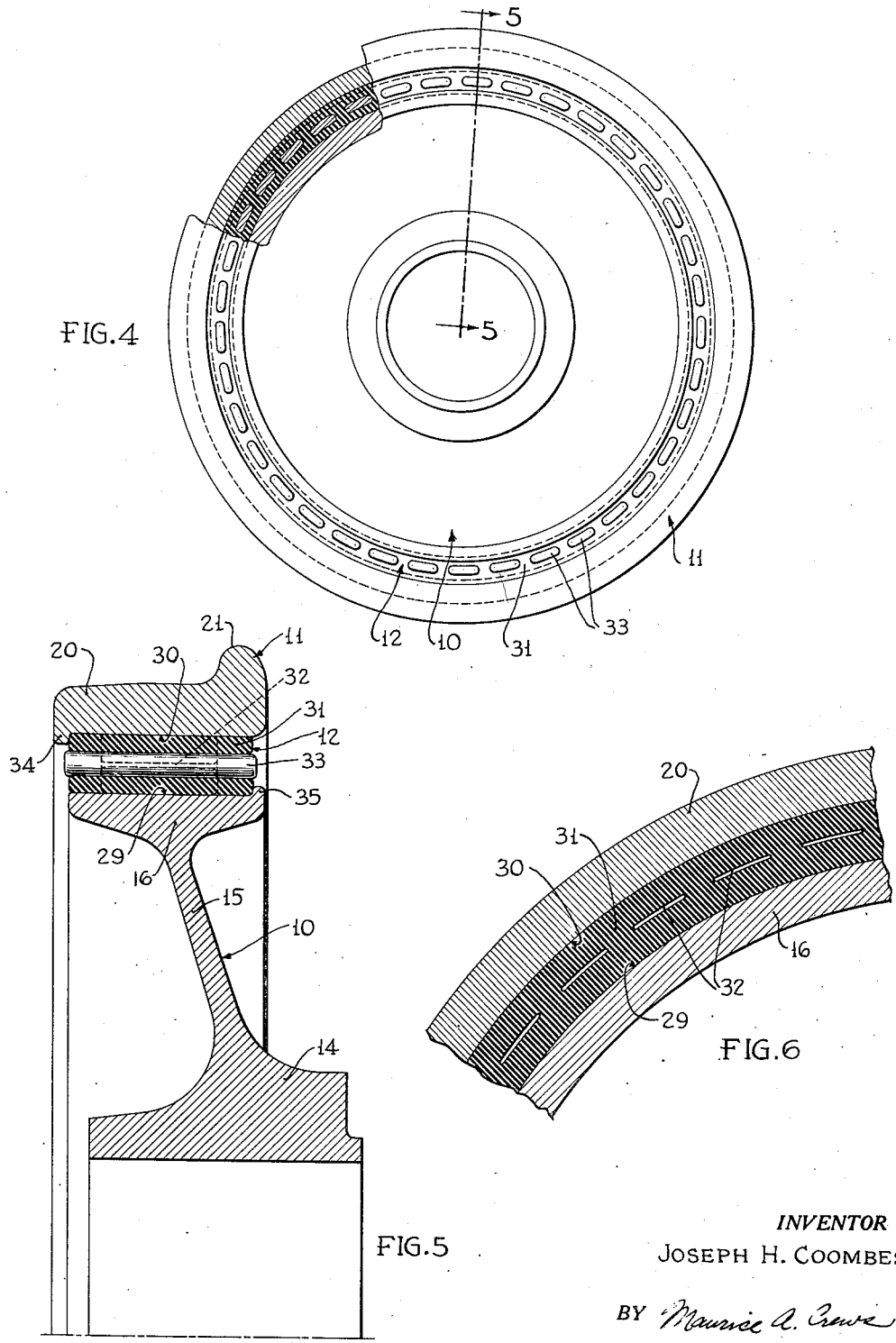
INVENTOR
JOSEPH H. COOMBES
BY *Maurice A. Crews*
ATTORNEY Patented Apr. 10, 1951

2,548,839

UNITED STATES PATENT OFFICE 2,548,839

CUSHIONED RAILWAY WHEEL

Joseph H. Coombes, Detroit, Mich., assignor to The Budd Company, Philadelphia, Pa., a corporation of Pennsylvania Application August 22, 1947, Serial No. 770,161

12 Claims. (Cl. 295—11)

The invention relates to railway wheels or other rotary elements and, more particularly, to such wheels or elements fabricated of a plurality of parts held together by yielding means capable of transmitting the driving and the other strains and effective to avoid transmission of shocks and high-frequency vibrations to the vehicle carried by said wheels.

It is an object of the invention to simplify the manufacture of such wheels or elements, to reduce costs and to provide a wheel or element of this class having a long life in service.

This object, and others which will presently appear, are attained by forming the wheel or element of a radially inner or hub section and a radially outer or rim section, these sections, being preferably made of different or differently treated metals or metal alloys, and each having characteristics which make it best suited for the use to which it is put.

These sections have axially extending surfaces adjacent each other, which surfaces are spaced from each other by a rubber or rubber-like filler of generally annular form, the rubber-like filler being provided with circumferentially spaced axially extending holes into which are driven axially extending metallic members, the rubber-like filler being in this operation so axially expanded and radially compressed as to provide a firm interlock between the outer and inner sections of the wheel capable of transmitting all driving and other stresses between them and at the same time cushioning the shocks and preventing the transmission of high-frequency vibrations to the vehicle on which the wheel is supported. If desired, the rubber may be bonded to the metal parts, as by vulcanizing, but, if placed under sufficient mass tension by the driving of the expanding metal members in place, the bonding due to this mass tension may alone be sufficient to securely hold the parts in their assembled relation.

Other and further objects and the manner in which they are attained will become evident from the following detailed description when read in connection with the drawings forming a part of this specification.

In the drawings:

Figure 1 is an inside elevational view, with parts shown in section, of a railway wheel according to the invention;

Figure 2 is an axial sectional view of the wheel, the section being taken substantially along the line 2—2 of Figure 1 and on an enlarged scale;

Figure 3 is an enlarged detail sectional view similar to the sectional part of Figure 1, but before the assembly of the wheel has been completed by the expansion and compression of the rubber; and Figures 4, 5 and 6 are views similar to Figures 1, 2 and 3, respectively, of a modified form of wheel according to the invention.

In the form of the invention shown in Figures 1 to 3, the inner or hub section of the railway wheel is designated generally by 10, the outer or rim section by 11, the intermediate rubber-like annular filler by 12 and the metallic expanding members embedded in the rubber by 13. These four elements constitute the entire wheel assembly without the necessity of attaching bolts or the like.

The inner section 10 may comprise a hub 14 suitably mounted on an axle (not shown) of the vehicle, a web 15 and an axially extended peripheral portion 16 extending outwardly and inwardly of the of the web 15. This axially extended portion 16 provides on its radially outer portion an axially extending surface 17 which extends continuously around the periphery. In this form of the invention, this surface is characterized, in cross section, by a scalloped or wavy formation, see Figures 1 and 3, consisting of alternate depressed portions 18 and raised portions 19. The depressed portions 18 may be of parti-cylindrical form and the raised portions 19 between two adjacent depressed portions may also terminate in parti-cylindrical surfaces of smaller diameter than the diameter of the depressed portions and merging with the parti-cylindrical surfaces of the adjacent depressed portions.

The radially outer or rim section 11 may comprise the rim portion proper 20 on which the wheel rolls, and the inboard arranged guiding flange 21 projecting outwardly from the outer face of the rim proper. The radially inner surface of this rim section preferably is an axially extending annual surface 22 in all respects similar to the annular surface 17 on the periphery of the inner section and spaced therefrom. It has depressed portions 23 similar to and opposite the depressed portions 18 and raised portions 24 similar to and opposite the raised portions 19.

In the assembly of the wheel, the inner and outer sections are held in their proper relation in a suitable jig and then generally cylindrical rubber or rubber-like elements 25 are inserted in the spaces formed by the respective opposed depressed portions 18 and 23. These rubber or rubber-like cylinders 25 are readily inserted under no or but very slight compression, and when so inserted, they contact each other and form the continous annular filler 12, hereinbefore referred to, between the outer and inner wheel sections, see Figure 3. Each of the rubber cylinders is, when inserted, of a length materially less than the axial extent of the surfaces 17 and 22, as shown in dotted lines in Figure 2, and each has a central hole 26 of reduced diameter extending axially therethrough. The final assembly of the wheel is now effected by driving into the central hole of each cylinder a metallic element or tube 13 of materially greater diameter than the reduced diameter of the hole 26 prior to the insertion of the element 13. All the tubes 13 may be simultaneously driven in place by a suitable machine, such as a hydraulic press, and when so driven in place the rubber cylinders 25 are axially expanded to substantially the width of the axial faces 17 and 22 and radially compressed so as to be placed under a high degree of mass tension, in which condition they provide a firm bonded engagement with the surfaces 17 and 22 to lock the two wheel sections together to take the driving, braking and other strains and, at the same time, act as a cushion to absorb shocks and prevent the transmission of high-frequency vibrations to the vehicle carried by the wheel.

If desired, the interlock may be made doubly secure by vulcanizing the rubber to the metal parts, although this may not be, in all cases, a necessary precaution.

Since such wheels are, in rounding a curve, subjected to heavy lateral forces acting against the guiding flange 21, suitable opposing inwardly and outwardly extending flanges 27 and 28 may be arranged, respectively, at the outboard margin of the surface 22 and at the inboard margin of the surface 17. These flanges 27 and 28 aid in resisting such heavy lateral forces acting on the guiding flange 21 through the compression and shear action of the rubber between them.

The tubular members 13 have the further capability of being used as a brake support for carrying a braking surface, not shown, one on the outboard face and one on the inboard face of the wheel. Such a yielding brake support is desirable to allow the uniform contact of the non-rotary brake shoes with the respective rotary braking surfaces.

It will be noted that the tubular elements 13 are of larger diameter than the spacing between the raised portions 19 and 24 of the respective surfaces 17 and 22 so that driving and braking forces, as well as radial loads are also transmitted through them under the cusioning action of the rubber.

In the form of the invention shown in Figures 4 to 6, inclusive, the wheel has been somewhat simplified at a sacrifice of positive transmission of the driving and braking forces through the metallic rubber-expanding elements 13.

In this form, plain cylindrical surfaces 29 and 30 have been substituted for the scalloped or wavy surfaces 17 and 22, respectively, and a continuous rubber or rubber-like annulus 31 has been substituted for the separate contacting rubber cylinders 25.

As shown by the dotted lines in Figure 5 and in full lines in Figure 6, this cylindrical rubber annulus is, prior to expansion, of materially less axial length than the surfaces 29 and 30 and is formed with closely circumferentially spaced narrow openings or slits 32 into which are driven metallic elements 33 not substantially wider than the circumferential width of said slits but materially thicker radially than the radial width of the slits. It will be seen that when these expanding elements 33 are driven axially in place in a manner similar to the assembly of the tubular members 13 of the form shown in Figures 1 to 3, that the rubber of the annulus 31 will be axially expanded and radially compressed to be placed in condition of high mass tension and thus form a strong bonding union between the rubber and the metal elements of its wheel to lock them together for taking the driving and other strains. Of course, as in the first form, the rubber may be vulcanized to the metal to make the bonding more secure. In this modification, flanges 34 and 35, similar to the corresponding flanges 27 and 28 of the form shown in Figures 1 to 3, are provided and for a similar purpose. The elements 33 of this form may be used as a brake support in the same way as the elements 13 of the first form.

While two specific embodiments of the invention have herein been described in detail, it will be understood that further changes and modifications may be made by those skilled in the art without departing from the main features of the invention, and such changes and modifications are intended to be covered in the appended claims.

What is claimed is:

1. In a railway wheel, in combination, a radially inner wheel section, a radially outer wheel section, said sections having opposed axially extending faces spaced apart by an annularly arranged rubber-like filler received between said opposed faces, said rubber-like filler having circumferentially spaced axially extending holes therein and being placed under such high compression between said faces by members of substantially uniform cross-section throughout their lengths and driven axially into the holes as to provide the sole means to lock the outer and inner wheel sections and said members so firmly together as to transmit all driving, braking and lateral strains while at the same time dampening shocks and minimizing transmission of high-frequency vibrations between the outer wheel section and the inner.

2. In a railway wheel, in combination, a radially inner wheel section, a radially outer wheel section, said sections having opposed axially extending faces spaced from each other, and an annularly arranged rubber-like filler interposed between said faces, said rubber-like filler having circumferentially spaced axially extending holes at intervals, and members of substantially uniform cross-section throughout their lengths and forced axially into said holes thereby expanding the rubber axially and compressing it radially into such strong engagement with said faces and said members as to enable the filler without other securing means to form the sole means for securing the parts in assembled relation and to transmit driving and braking strains while preventing the transmission of sudden shocks and high-frequency vibrations between the outer and inner wheel sections.

3. In a railway wheel, in combination, a radially inner wheel section, a radially outer wheel section, said sections being tied together solely by an annular filler, for the most part of rubber in compression, said annular filler having a plurality of circumferentially spaced holes and being placed in holding compression by members of substantially uniform cross-section throughout their lengths and driven into said holes to expand the rubber axially and compress it radially and held in place solely by the rubber.

4. In a railway wheel, in combination, a radially inner wheel section having a scalloped outer periphery formed by parti-cylindrical depressions alternating with raised portions therebetween, a radially outer wheel section having a similar inner periphery spaced from the outer periphery of said radially inner section, and with the depressions and raised portions thereof radially opposite the depressions and raised portions of said inner section, rubber bushings inserted between the respective opposed depressions, and tubular expanders of substantially uniform cross-section throughout their lengths and driven into the rubber bushings to expand them axially and compress the rubber radially to provide a strong interlock between the outer and inner wheel sections and said tubular expanders sufficient to hold the parts in assembled relation.

5. In a railway wheel, in combination, a radially inner wheel section having an outer cylindrical periphery, a radially outer wheel section having an inner cylindrical periphery spaced from the periphery of said inner section, and a rubber annulus filling the space between the peripheries of said outer and inner sections, said annulus having spaced axially extending holes therein, and being forced into firm holding engagement with said peripheries by members of substantially uniform cross-section throughout their lengths and driven into said holes and retained therein solely by the mass tension of the rubber.

6. In a railway wheel, in combination, a radially inner wheel section having an axially extending outer periphery and a radially outwardly extending flange at one margin of said periphery, a radially outer wheel section having an axially extending inner periphery spaced from the outer periphery of said inner wheel section and a radially inwardly extending flange at the margin of said outer periphery axially opposite the flange on the periphery of the inner wheel section, and an annular filler for the most part of rubber in compression between said peripheries, said annular filler having a plurality of circumferentially spaced holes and being placed in compression by members of substantially uniform cross-section throughout their lengths and driven into said holes to expand the rubber axially and compress it radially and held in place solely by the rubber.

7. In a railway wheel, in combination, a radially inner section, a radially outer or rim section having a guiding flange along one margin thereof, said sections being tied together solely by an annular filler, for the most part rubber in compression, said annular filler having a plurality of circumferentially spaced holes and being axially expanded and radially compressed into strong holding engagement with said sections by members of substantially uniform cross-section throughout their lengths and driven into said holes and held therein solely by the rubber, and an inwardly extending flange along the margin of said rim section axially opposite said guiding flange and an outwardly extending flange along the inboard margin of the periphery of said inner section for resisting, through the shear and compression of the rubber, lateral forces transmitted to said guiding flange by an associated rail.

8. In a railway wheel, in combination, a radially inner or hub section, a radially outer or rim section, said sections being tied together by an annular filler, for the most part of rubber in compression, said annular filler having a plurality of circumferentially spaced holes and being placed in holding compression by members of substantially uniform cross-section throughout their lengths and driven into said holes to expand the rubber axially and compress it radially and held in place solely by the rubber, said members projecting free of the rubber at opposite sides of the wheel and providing means for securing a brake member to one or both sides of the wheel.

9. In a flexible joint construction, in combination, a radially inner part, a radially outer part, said parts having opposed axially extending faces spaced from each other, and an annularly arranged rubber-like filler interposed between said faces, said rubber-like filler having circumferentially spaced axially extending holes at intervals, and members of substantially uniform cross-section throughout their lengths and forced axially into said holes thereby expanding the rubber axially and compressing it radially into such strong engagement with said faces as to enable the filler without other securing means to maintain the parts in assembled relation and to transmit torque strains between said parts.

10. In a flexible joint construction, in combination, a radially inner part, a radially outer part, said parts being tied together by an annular filler, for the most part rubber in compression, said annular filler having a plurality of circumferentially spaced holes and being placed in holding compression by members of substantially uniform cross-section throughout their lengths and driven into said holes to expand the rubber axially and compress it radially and held in place solely by the rubber.

11. In a flexible joint structure, in combination, a radially inner part having a scalloped outer periphery formed by parti-cylindrical depressions alternating with raised portions therebetween, a radially outer part having a similar inner periphery spaced from the outer periphery of said radially inner part, and with the depressions and raised portions thereof radially opposite the depressions and raised portions of said inner part, rubber bushings inserted between the respective opposed depressions, and tubular expanders of substantially uniform cross-section throughout their lengths and driven into the rubber bushings to expand them axially and compress the rubber radially to provide a strong interlock serving as the sole interconnection between the outer and inner parts and said tubular expanders to hold the parts in assembled relation.

12. In a flexible joint structure, in combination, a radially inner part having an outer cylindrical periphery, a radially outer part having an inner cylindrical periphery spaced from the periphery of said inner part, and a rubber annulus fitting the space between the peripheries of said outer and inner parts, said annulus having spaced axially extending holes therein, and being forced into firm holding engagement with said peripheries by members of substantially uniform cross-section throughout their lengths and driven into said holes and retained therein solely by the mass tension of the rubber.

JOSEPH H. COOMBES.

REFERENCES CITED

The following references are of record in the file of this patent:

UNITED STATES PATENTS

| Number | Name | Date |
| --- | --- | --- |
| 1,473,483 | Lauhoff | Nov. 6, 1923 |
| 1,648,413 | Maas | Nov. 8, 1927 |
| 1,980,663 | Burrows | Nov. 13, 1934 |
| 2,329,901 | Herrington | Sept. 21, 1943 |

FOREIGN PATENTS

| Number | Country | Date |
| --- | --- | --- |
| 378,837 | Great Britain | Aug. 18, 1932 |
| 49,613 | France | May 16, 1939 |